United States Patent [19]
Ivie

[11] Patent Number: 6,161,861
[45] Date of Patent: Dec. 19, 2000

[54] APPLIANCE-MOVING DOLLY KIT

[76] Inventor: Don B. Ivie, 221 Ravine, Pocatello, Id. 83204

[21] Appl. No.: 08/970,007

[22] Filed: Nov. 13, 1997

[51] Int. Cl.$^7$ ...................................................... B62B 1/04
[52] U.S. Cl. .......................... 280/655; 280/47.371; 16/30
[58] Field of Search .................. 280/655, 655.1, 280/43, 43.17, 43.22, 47.315, 47.331, 47.371, 79.3, 654, 43.1; 16/29, 30, 114 R; 403/3, 4

[56] References Cited

U.S. PATENT DOCUMENTS

| | | | |
|---|---|---|---|
| 4,615,534 | 10/1986 | Blain | 280/43.17 |
| 5,249,438 | 10/1993 | Rhaney et al. | 280/43.1 |
| 5,426,817 | 6/1995 | Rekuc | 16/29 |
| 5,593,271 | 1/1997 | Hall | 280/43 |
| 5,641,170 | 6/1997 | Helm | 280/655 |
| 5,709,398 | 1/1998 | Lu | 280/47.24 |
| 5,727,284 | 3/1998 | Deutsch | 16/30 |
| 5,730,264 | 3/1998 | Lu | 190/108 |
| 5,822,829 | 10/1998 | Webb et al. | 16/30 |
| 5,941,543 | 8/1999 | Kazmark, Jr. | 280/47.29 |

*Primary Examiner*—Lanna Mai
*Assistant Examiner*—Lynda Jasmin

[57] ABSTRACT

A retrofitted dolly system is included for use with an appliance having a rectilinear configuration with a top face, a bottom face, a rear face, a front face, and a pair of side faces. The system includes at least one wheel assembly having a mounting unit mounted to the appliance and a wheel slidable with respect to the mounting unit. Further provided is a coupling mechanism for selectively fixing the wheel with respect to the appliance at a predetermined height.

2 Claims, 2 Drawing Sheets

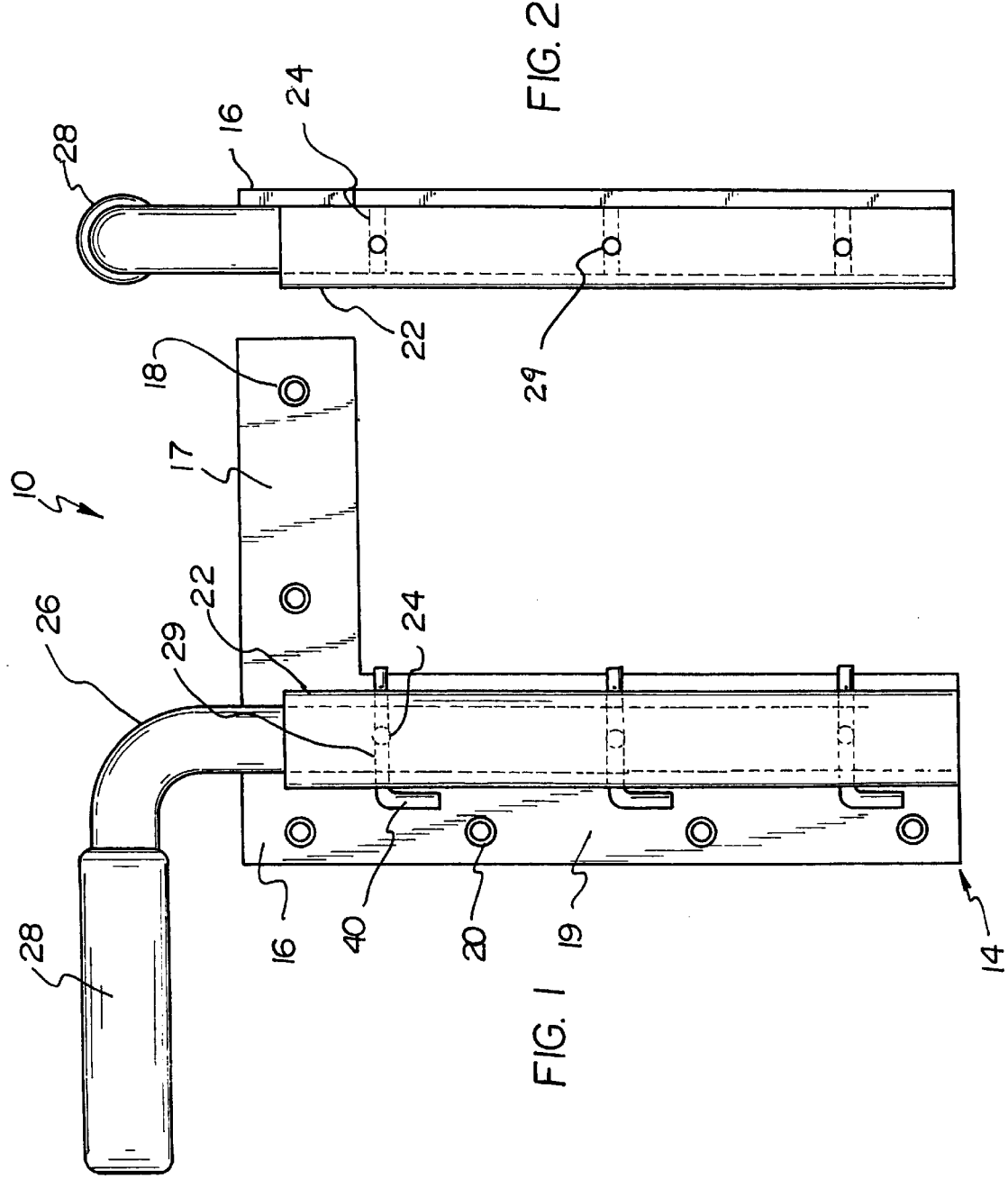

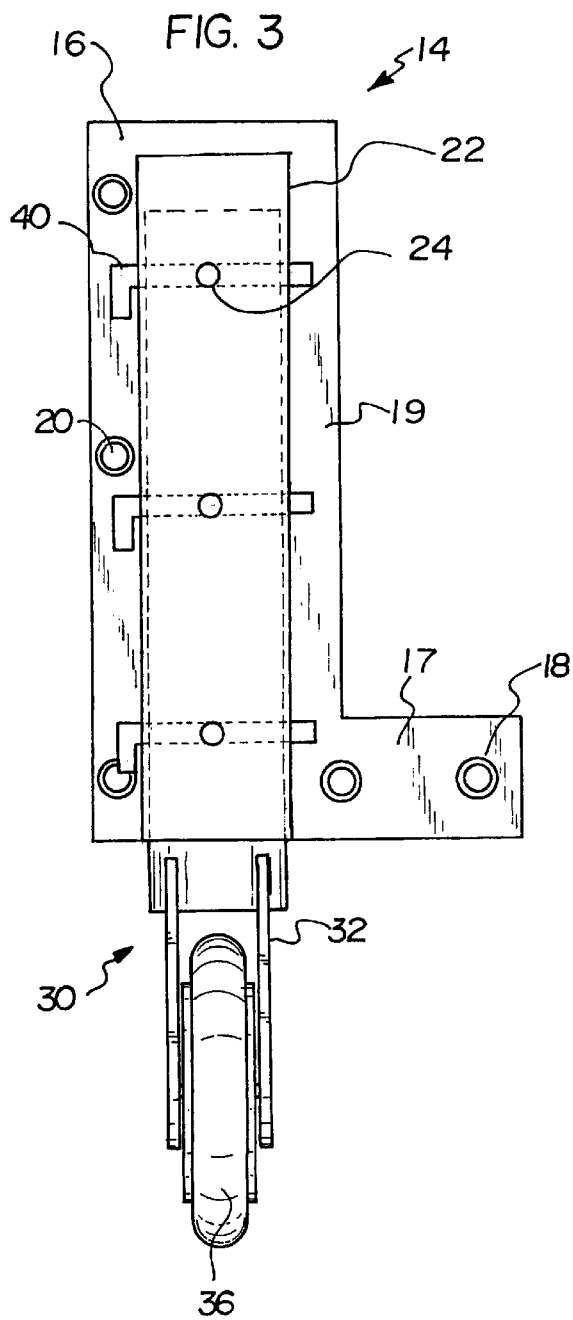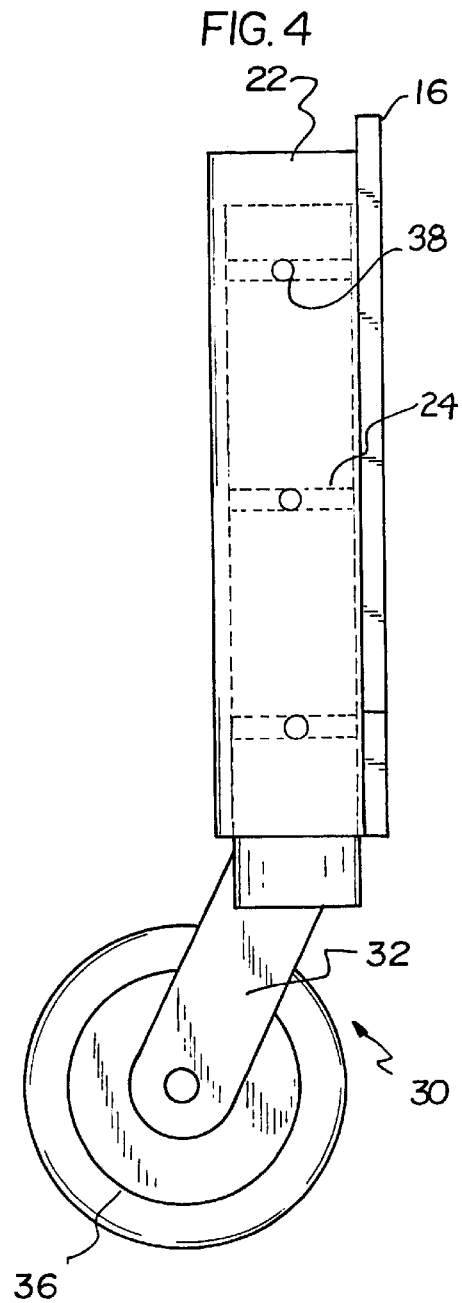

APPLIANCE-MOVING DOLLY KIT

BACKGROUND OF THE INVENTION

1. Field of the Invention

The present invention relates to moving carts and more particularly pertains to a new appliance-moving dolly kit for providing a portable wheel and handle assembly to be retrofitted to an appliance or the like.

2. Description of the Prior Art

The use of moving carts is known in the prior art. More specifically, moving carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art moving carts include U.S. Pat. No. 5,232,233; U.S. Pat. No. 5,048,850; U.S. Pat. No. 3,942,813; U.S. Pat. Des. 340,337; U.S. Pat. No. 5,158,312; and U.S. Pat. No. 4,695,067.

In these respects, the appliance-moving dolly kit according to the present invention substantially departs from the conventional concepts and designs of the prior art, and in so doing provides an apparatus primarily developed for the purpose of providing a portable wheel and handle assembly to be retrofitted to an appliance or the like.

SUMMARY OF THE INVENTION

In view of the forgoing disadvantages inherent in the known types of moving carts now present in the prior art, the present invention provides a new appliance-moving dolly kit construction wherein the same can be utilized for providing a portable wheel and handle assembly to be retrofitted to an appliance or the like.

The general purpose of the present invention, which will be described subsequently in greater detail, is to provide a new appliance-moving dolly kit apparatus and method which has many of the advantages of the moving carts mentioned heretofore and many novel features that result in a new appliance-moving dolly kit which is not anticipated, rendered obvious, suggested, or even implied by any of the prior art moving carts, either alone or in any combination thereof.

To attain this, the present invention generally comprises an unillustrated appliance having a rectilinear configuration with a top face, a bottom face, a rear face, a front face, and a pair of side faces. Further provided are a pair of handle and wheel assemblies. The handle and wheel assemblies both include a mounting unit including a planar base plate having an L-shaped configuration. As shown in the Figures, the base plate is equipped with a planar horizontal extent with a pair of mounting apertures formed at ends thereof. Associated therewith is a planar vertical extent with a plurality of mounting apertures formed along an exterior edge thereof. The mounting unit further includes a tubular sleeve having a length similar to that of the vertical extent. The sleeve is coupled along an interior edge of the vertical extent. The sleeve has a plurality of diametrically aligned bores formed along a length thereto. Axes associated with the bores are positioned in parallel with the base plate. The base plate may be removably mounted to the rear surface of the appliance adjacent to the top face and one of the side faces thereof. As shown in FIGS. 1 & 2, the handle assemblies each include an inverted L-shape handle having a top horizontal extend with a grip mounted thereon. A bottom vertical extent of the handle is slidably and rotatably mounted within the sleeve. The bottom vertical extent further has a plurality of diametrically positioned bores formed therein. As shown in FIGS. 3 & 4, the pair of wheel assemblies each include a wheel unit having a top extent with a cylindrical configuration. Such top extent is slidably and rotatably mounted within the sleeve. A bottom extent of each wheel assembly includes a fork mounted to a bottom of the top extent. The fork has a wheel rotatably mounted thereon. The top extent of the wheel unit includes a plurality of diametrically opposed apertures formed therein. Lastly, a plurality of L-shaped pins are each adapted to be slidably situated within the bores of the mounting unit and wheel unit and L-shaped handle such that the wheel unit and handle are fixed at a selected height and rotational orientation respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with the patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new appliance-moving dolly kit apparatus and method which has many of the advantages of the moving carts mentioned heretofore and many novel features that result in a new appliance-moving dolly kit which is not anticipated, rendered obvious, suggested, or even implied by any of the prior art moving carts, either alone or in any combination thereof.

It is another object of the present invention to provide a new appliance-moving dolly kit which may be easily and efficiently manufactured and marketed.

It is a further object of the present invention to provide a new appliance-moving dolly kit which is of a durable and reliable construction.

An even further object of the present invention is to provide a new appliance-moving dolly kit which is susceptible of a low cost of manufacture with regard to both materials and labor, and which accordingly is then susceptible of low prices of sale to the consuming public, thereby making such appliance-moving dolly kit economically available to the buying public.

Still yet another object of the present invention is to provide a new appliance-moving dolly kit which provides in the apparatuses and methods of the prior art some of the advantages thereof, while simultaneously overcoming some of the disadvantages normally associated therewith.

Still another object of the present invention is to provide a new appliance-moving dolly kit for providing a portable wheel and handle assembly to be retrofitted to an appliance or the like.

Even still another object of the present invention is to provide a new appliance-moving dolly kit that includes at least one wheel assembly having a mounting unit mounted to the appliance and a wheel slidable and rotatable with respect to the mounting unit. Further provided is a coupling mechanism for selectively fixing the wheel with respect to the appliance at a predetermined height and rotatable orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of one of the handle assemblies of a new appliance-moving dolly kit according to the present invention.

FIG. 2 is a side view of the handle assembly of the present invention.

FIG. 3 is a front view of the wheel assembly of the present invention.

FIG. 4 is a side view of the wheel assembly shown in FIG. 3.

DESCRIPTION OF THE PREFERRED EMBODIMENT

With reference now to the drawings, and in particular to FIG. 1 through 4 thereof, a new appliance-moving dolly kit embodying the principles and concepts of the present invention and generally designated by the reference numeral 10 will be described.

The present invention, as designated as numeral 10, includes an unillustrated appliance having a rectilinear configuration with a top face, a bottom face, a rear face, a front face, and a pair of side faces. Further provided are a pair of handle and wheel assemblies.

The handle and wheel assemblies both include a mounting unit 14 having a planar base plate 16 with an L-shaped configuration. As shown in the Figures, the base plate is equipped with a planar horizontal extend 17 with a pair of mounting apertures 18 formed at ends thereof. Associated therewith is a planar vertical extent 19 with a plurality of mounting apertures 20 formed along an exterior edge thereof. In the case of the wheel assemblies, the horizontal extent is ¼ the length of the vertical extent and situated at a lower end of the vertical extent. The horizontal extend of the handle assemblies, on the other hand, are about ½ that of the vertical extent and situated at an upper end of the vertical extent.

The mounting unit of each of the assemblies further includes a tubular sleeve 22 having a length similar to that of the vertical extent. The sleeve is coupled along an interior edge of the vertical extent. The sleeve has a plurality of diametrically aligned bores 24 formed along a length thereof. Axes associated with the bores are positioned in parallel and perpendicular with the base plate. As such, at three elevations there is a pair cross-shaped bores formed in the sleeve which reside in a common horizontal plane. During use, the base plate may be removably mounted to the rear surface of the appliance adjacent to either the top or bottom face and one of the side faces thereof.

As shown in FIGS. 1 & 2, the handle assemblies each include an inverted L-shaped handle 26 having a top horizontal extent with a grip 28 mounted thereon. A bottom vertical extent of each handle is slidably and rotatably mounted within the corresponding sleeve. Such rotation is about a vertical axis. As shown in the Figures, the bottom vertical extent has a length twice that of the top horizontal extent. The bottom vertical extent further has a plurality of diametrically positioned bores 29 formed therein.

As shown in FIGS. 3 & 4, the pair of wheel assemblies 30 each include a wheel unit having a top extent with a cylindrical configuration. Such a top extent is slidably and rotatably mounted within the sleeve. Such rotation is about a vertical axis. A bottom extent of each wheel assembly includes a fork 32 fixedly mounted to a bottom of the top extent. The fork has a wheel 36 rotatably mounted thereon. The top extent of the wheel unit includes a plurality of diametrically opposed apertures 38 formed therein. It should be noted that the apertures of the handle and wheel assemblies each comprise a pair of perpendicular bores. As such, at three elevations there is a pair cross-shaped bores which reside in a common horizontal plane.

Lastly, a plurality of L-shaped pins 40 are each adapted to be slidably situated within the bores of the mounting unit and wheel unit and handle such that the wheel unit and handle are fixed at a selected height and rotational orientation, respectively.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retrofitted wheel and handle system for use with an appliance having a rectilinear configuration with a top face, a bottom face, a rear face, a front face, and a pair of side faces, the system comprising:

a pair of handle assemblies each including:

a handle mounting unit including a planar base plate having an inverted L-shaped configuration with a planar horizontal extent with a pair of mounting apertures formed at ends thereof and a planar vertical extent with a plurality of mounting apertures formed along an exterior edge thereof, the handle mounting unit further including a tubular sleeve having a length substantially to that of the vertical extent with the sleeve coupled along an interior edge of the vertical extent, the sleeve having a plurality of diametrically aligned bores formed along a length thereof with axes associated with the bores being positioned in parallel with the base plate, whereby the base plate of the handle mounting unit may be removably mounted to the rear surface of the appliance adjacent to the top face and one of the side faces of the appliance, an inverted L-shaped handle having a top horizontal extent with a grip mounted thereon and a bottom vertical extent slidably and rotatably mounted within the sleeve, the bottom vertical extent having a plurality of diametrically positioned bores formed therein, and a plurality of L-shaped pins each adapted to be slidably situated within the bores of the handle mounting unit and handle such that the handle is fixed at a selected height and rotational orientation of the grip; and a pair of wheel assemblies each including:

a wheel mounting unit including a planar base plate having a L-shaped configuration with a planar horizontal extent with a pair of mounting apertures formed at ends thereof and a planar vertical extent with a plurality of mounting apertures formed along an exterior edge thereof, the wheel mounting unit further including a tubular sleeve having a length substantially to that of the vertical extent with the sleeve coupled along an interior edge of the vertical extent, the sleeve having a plurality of diametrically aligned bores formed along a length thereof with axes associated with the bores being positioned in parallel with the base plate, whereby the base plate of the wheel mounting unit may be removably mounted to the rear surface of the appliance adjacent to the bottom face and one of the side faces thereof, a wheel unit having a top extent with a cylindrical configuration slidably and rotatably mounted within the sleeve and a bottom extent including a fork mounted to a bottom of the top extent, the fork having a wheel rotatably mounted thereon, the top extent of the wheel unit having a plurality of diametrically opposed apertures formed therein, and a plurality of L-shaped pins each adapted to be slidably situated within the bores of the wheel mounting unit and wheel unit such that the wheel unit is fixed at a selected height and rotational orientation.

2. A retrofitted wheel and handle system for use with an appliance having a rectilinear configuration with a top face, a bottom face, a rear face, a front face, and a pair of side faces, the system comprising:

a pair of wheel assemblies, each of the wheel assemblies including:

a mounting unit adapted for fixedly mounting to the appliance, the mounting unit having a base plate having a L-shaped configuration with a planar horizontal extent with a pair of mounting apertures formed at ends thereof and a planar vertical extent with a plurality of mounting apertures formed along an exterior edge thereof;

a wheel rotatable about a vertical axis with respect to the mounting unit; and coupling means for selectively fixing the wheel to the mounting unit in a selected rotatable orientation; and a pair of handle assemblies, each of the handle assemblies including:

a handle mounting unit including a base plate having a horizontal extent and a vertical extent, the handle mounting unit further including a tubular sleeve having a length with the sleeve being coupled to the vertical extent, the sleeve having a plurality of diametrically aligned bores formed along a length thereof with axes associated with the bores being positioned in parallel with the base plate, the base plate of the handle mounting unit being for removably mounting to the rear surface of the appliance adjacent to the top face and one of the side faces of the appliance, an inverted L-shaped handle having a top horizontal extent with a grip mounted thereon and a bottom vertical extent slidably and rotatably mounted in the sleeve, the bottom vertical extent having a plurality of diametrically positioned bores formed therein, and a plurality of pins each adapted to be slidably situated in the bores of the handle mounting unit and handle such that the handle is fixed at a selected height and rotational orientation of the grip.

* * * * *